United States Patent

Berg et al.

[15] 3,676,340
[45] July 11, 1972

[54] COMBINATIONS OF DETERGENTS WITH CONTROLLED FOAMING PROPERTIES AND WASHING AGENTS CONTAINING THEM

[72] Inventors: Markus Berg, Dusseldorf-Holthausen; Walter Fries, Erkrath, Unterbach, Rhineland; Alfred Kirstahler, Dusseldorf, all of Germany

[73] Assignee: Henkel & Cie GmbH, Dusseldorf, Germany

[22] Filed: July 18, 1968

[21] Appl. No.: 752,097

[30] Foreign Application Priority Data

July 19, 1967 Germany..............................H 63320
April 27, 1968 Germany.....................P 17 67 334.6

[52] U.S. Cl..........................252/8.75, 252/8.6, 252/110, 252/132, 252/321, 252/358, 252/524, 252/539
[51] Int. Cl......................C11d 1/84, C11d 3/28, C11d 9/24
[58] Field of Search.................252/152, 110, 117, 321, 358, 252/137; 260/249.5

[56] References Cited

UNITED STATES PATENTS

| | | | |
|---|---|---|---|
| 2,363,921 | 11/1944 | Denman | 252/321 |
| 2,668,150 | 2/1954 | Luvisi | 252/321 |
| 2,954,347 | 9/1960 | St. John et al. | 252/358 |
| 3,422,020 | 1/1969 | Schmadel et al. | 252/358 |
| 3,539,521 | 11/1970 | Snoddy et al. | 252/152 |
| 3,451,935 | 6/1969 | Roald et al. | 252/135 |
| 3,280,179 | 10/1966 | Ernst | 252/117 X |

OTHER PUBLICATIONS

Ault et al., " Branched Chain Fatty Acids and Sulfonated Derivatives" Journal of the American Oil Chemists Society, (March, 1965) Vol. 42 pp 233– 6

Textilana–Bulletin, " The Sulfubetaines," printed prior to 1966

*Primary Examiner*—Leon D. Rosdol
*Assistant Examiner*—Dennis L. Albrecht
*Attorney*—Hammond & Littell

[57] ABSTRACT

This invention relates to a combination of anionic and/or nonionic surface-active compounds together with a foam stabilizer and a foam inhibitor active at temperatures above 60° C, said combination having controlled foaming properties, containing therein as foam stabilizer active at temperatures up to 60° C, a compound of the formula selected from the group consisting of

I

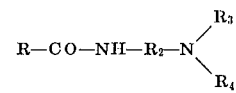

II

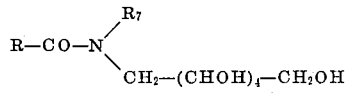

III

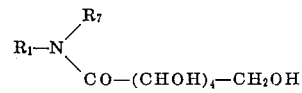

IV

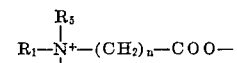

V 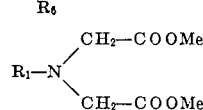

and

VI 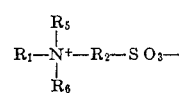

wherein R—CO represents the acyl of a fatty acid with 10 to 18 carbon atoms, $R_1$ represents an aliphatic hydrocarbon radical with 10 to 18 carbon atoms, $R_2$ represents an alkylene group with two to five carbon atoms, $R_3$ and $R_4$ represent members selected from the group consisting of hydroxyethyl, hydroxypropyl and dihydroxypropyl, $R_5$ and $R_6$ represent members selected from the group consisting of methyl, ethyl, hydroxyethyl, hydroxypropyl and dihydroxypropyl, $R_7$ represents members selected from the group consisting of hydrogen, methyl, ethyl, hydroxyethyl, hydroxypropyl and dihydroxypropyl, $n$ is an integer from 1 to 2 and Me represents a member selected from the group consisting of hydrogen and alkali metal. The invention also relates to washing agents having controlled foaming properties containing the above combination of surface-active compounds.

14 Claims, No Drawings

COMBINATIONS OF DETERGENTS WITH CONTROLLED FOAMING PROPERTIES AND WASHING AGENTS CONTAINING THEM

THE PRIOR ART

In the field of commercial washing agents, the light duty washing agents for fine laundering can be distinguished from the heavy-duty or boiling washing agents in that the former have a relatively good foaming power and in view of the material to be washed are generally only used at moderately elevated temperatures of, for example, 45° C. The heavy-duty washing agents have also to be suitable for use in drum washing machines. It is important for them, therefore, to possess a limited foaming power and above all, that the washing machines should not be allowed to foam over in the region of the boiling temperature. In addition, washing agents are often put on the market as "universal washing agents." Such washing agents should also be suitable for the treatment of fine laundering at low temperatures, in which case a good development of foam is of importance which, as the temperature rises, should become less and less.

Our copending U.S. Pat. application Ser. No. 745,952, filed concurrently herewith, and now abandoned, describes combinations of surface-active compounds which contain foam inhibitors with an action dependent on the temperature. Moreover, foam stabilizers are mentioned as possible components. These are to improve the foaming power of the washing agents when used under fine washing conditions, while the foam inhibitors are intended to suppress the foam, as the temperature rises, to such an extent that the washing agents can also be used in drum washing machines in the vicinity of the boiling temperature.

OBJECTS OF THE INVENTION

An object of the present invention is the obtention of a combination of surface-active components for use in a washing bath having controlled foaming properties comprising surface-active compounds selected from the group consisting of anionic surface-active compounds, non-ionic surface active compounds and mixtures thereof, a foam inhibitor active at temperatures above 60° C and an effective amount of a foam stabilizer compound active at temperatures up to 60° C of the formula selected from the group consisting of

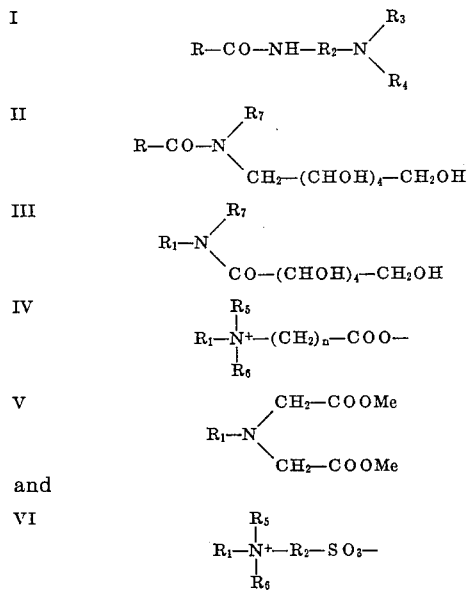

I  $\quad R-CO-NH-R_2-N\begin{pmatrix}R_3\\R_4\end{pmatrix}$

II $\quad R-CO-N\begin{pmatrix}R_7\\CH_2-(CHOH)_4-CH_2OH\end{pmatrix}$

III $\quad R_1-N\begin{pmatrix}R_7\\CO-(CHOH)_4-CH_2OH\end{pmatrix}$

IV $\quad R_1-\overset{R_5}{\underset{R_6}{N^+}}-(CH_2)_n-COO^-$

V $\quad R_1-N\begin{pmatrix}CH_2-COOMe\\CH_2-COOMe\end{pmatrix}$ and

VI $\quad R_1-\overset{R_5}{\underset{R_6}{N^+}}-R_2-SO_3^-$ wherein R-CO represents the acyl of a fatty acid with 10 to 18 carbon atoms, $R_1$ represents an aliphatic hydrocarbon radical with 10 to 18 carbon atoms, $R_2$ represents an alkylene group with two to five carbon atoms, $R_3$ and $R_4$ represent members selected from the group consisting of hydroxyethyl, hydroxypropyl and dihydroxypropyl, $R_5$ and $R_6$ represent members selected from the group consisting of methyl, ethyl, hydroxyethyl, hydroxypropyl and dihydroxypropyl, $R_7$ represents members selected from the group consisting of hydrogen, methyl, ethyl, hydroxyethyl, hydroxypropyl and dihydroxypropyl, $n$ is an integer from 1 to 2 and Me represents a member selected from the group consisting of hydrogen and alkali metal.

A further object of the invention is the obtention of a combination of surface-active components for use in a washing bath having controlled foaming properties of the above constitution together with a branched chain carboxylic acid textile softener or a content of enzymes.

A still further object of the invention is the obtention of washing agents having controlled foaming properties comprising the above combinations of surface-active components together with the customary alkaline and neutral builders and other customary washing agent components.

These and other objects of the present invention will become more apparent as the description thereof proceeds.

DESCRIPTION OF THE INVENTION

The invention relates to a combination of surface-active components with controlled foaming properties comprising anionic and/or non-ionic surface-active compounds, and an anti-foaming substance active at temperatures above 60° C, and is characterized by the simulataneous presence of a foam stabilizer active at temperatures up to 60° C. Suitable foam stabilizers for this purpose are, for example, compounds of the following formulas:

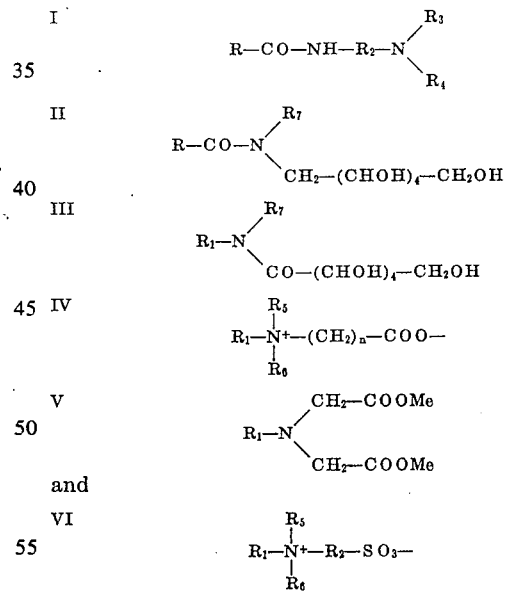

I  $\quad R-CO-NH-R_2-N\begin{pmatrix}R_3\\R_4\end{pmatrix}$

II $\quad R-CO-N\begin{pmatrix}R_7\\CH_2-(CHOH)_4-CH_2OH\end{pmatrix}$

III $\quad R_1-N\begin{pmatrix}R_7\\CO-(CHOH)_4-CH_2OH\end{pmatrix}$

IV $\quad R_1-\overset{R_5}{\underset{R_6}{N^+}}-(CH_2)_n-COO^-$

V $\quad R_1-N\begin{pmatrix}CH_2-COOMe\\CH_2-COOMe\end{pmatrix}$ and

VI $\quad R_1-\overset{R_5}{\underset{R_6}{N^+}}-R_2-SO_3^-$

In these formulas RCO represents the acyl of a fatty acid with 10 to 18 carbon atoms, $R_1$ represents an aliphatic hydrocarbon residue with 10 to 18 carbon atoms, such as an alkyl or an alkenyl. Preferably, both R—CO and $R_1$ are derived from mixtures of fatty acids. The residues with 10 to 14 carbon atoms preferably constituting at least 50 percent and especially more than 65 percent of the total residues present where mixed residues are utilized. In the case of the other terms, $R_2$ is an alkylene group containing two to five carbon atoms, $R_3$ and $R_4$ are hydroxyethyl, or mono- or di-hydroxypropyl, $R_5$ and $R_6$ are methyl or ethyl or one of $R_3$, $R_7$ is a hydrogen atom or one of $R_3$ or $R_5$, $n$ is one of the whole numbers 1 and 2 and Me is hydrogen or an alkali metal, especially sodium. The compounds IV and VI shown as betaines may also be present in the form of their alkali metal salts.

The invention further relates to a combination of surface-active compounds I having controlled foaming properties containing 99 to 80 percent, preferably 99 to 84 percent and especially 98 to 94 percent by weight of surface-active components, consisting of:

- 0 to 100 percent preferably 25 to 80 percent by weight of surface-active compounds of the sulfonate and/or sulfate type,
- 0 to 100 percent preferably 5 to 35 percent by weight of non-ionic surface-active compounds,
- 0 to 100 percent preferably 0 to 50 percent and advantageously 1 to 40 percent by weight of soap including a fraction of soap which may be present, serving as a foam inhibitor, and derived from saturated fatty acids with 20 to 30 carbon atoms,
- 1 to 10 percent preferably 1 to 8 percent by weight of the above foam stabilizers,
- 0 to 10 percent preferably 1 to 8 percent by weight of non-surface-active foam inhibitors, where at least one of the two foam-inhibiting components is always present. In such surface-active compound combinations I, the amount of anionic surface-active compound including soap which may be present generally constitutes at least 50 percent and preferably at least 75 percent of the total amount of surface-active compounds present. If the above-mentioned soap component is present only as the foam inhibitor, this should constitute at least 5 percent, preferably 10 to 30 percent by weight of the combination of surface-active compounds I.

The invention further relates to a textile softener containing the combination of surface-active compounds II of the following composition:

- 90 to 30 percent preferably 80 to 50 percent by weight of the combination of surface-active compounds I,
- 10 to 70 percent preferably 20 to 50 percent by weight of branched-chain carboxylic acid textile softeners of the general formula

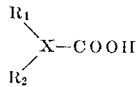

or its water-soluble salts, wherein $R_1$ and $R_2$ represent straight or branched chain alkyl radicals, which may be the same or different, containing six to 18, preferably eight to 12, carbon atoms, while X represents one of the following trivalent links:

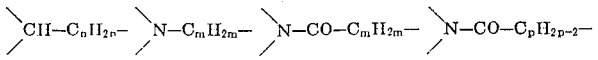

in which $n$ represents the whole numbers 0 to 2, $m$ represents the whole numbers 1 or 2 and $p$ represents the whole numbers 2 or 3. The number of carbon atoms present in $R_1$ and $R_2$ may be the same or different. If different, the larger of the two alkyl radicals preferably contains not more than twice as many, and in particular not more than 1.5 times as many carbon atoms as the smaller of the two alkyl radicals. Preferably, the sum of the total number of carbon atoms in $R_1$ and $R_2$ should be between 12 and 24, especially between 14 and 20. In addition to the carboxylic acids indicated above, small amounts of similarly constructed compounds may be present which contain in the residues $R_1$, $R_2$ and perhaps also in the residue X, more or less carbon atoms than the number indicated, without the desired effect being thereby harmed.

The percentages given in the above formulations relate to the pure surface-active compounds, textile softeners, foam stabilizers and foam inhibitors. All of these substances may still contain certain impurities from their technical production, as for example water, sodium sulfate, sodium chloride or sodium carbonate. Since these impurities do not in any way impair the activity of the individual substances, they were not included in the formulations.

The invention also relates to washing agents containing:

- 10 to 80 percent, preferably 12 to 40 percent by weight of one of the combinations of surface-active compounds I or II,
- 87 to 14 percent, preferably 85 to 30 percent by weight of builders, at least a part of these builders having an alkaline reaction and the amount of the alkaline and neutral reacting builders preferably constituting 0.5 to 7 times, and especially 1 to 5 times, the total combinations of surface-active compounds present,
- 3 to 30 percent by weight of other washing agent components or additives, such as for example, bleaching components, dirt carriers, brighteners, perfumes, dyestuffs, water.

The substances present as foam inhibitors in the products according to the invention should be active above all at temperatures above 60° C. This does not exclude them from already displaying a certain foam-inhibiting action also below 60° C.

In combination with synthetic anionic and/or non-ionic surface-active compounds, as well as in some cases with soaps of $C_{12}$—$C_{18}$ fatty acids, the soaps from saturated fatty acids or fatty acid mixtures with 20 to 30, preferably 20 to 26 carbon atoms are suitable as foam inhibitors, such as are obtained, for example, from hardened rapeseed oil or hardened marine animal oils.

While the above said soaps, according to their general structure, still belong to the surface-active substances, foam inhibitors can also be used which are not surface-active compounds. These may include chlorine-containing N-alkylated aminotriazines, which are obtainable by reaction of one mol of cyanuric chloride with two to three mols of a mono- and/or di-alkylamine with 6 to 20, preferably eight to 18 carbon atoms in the alkyl radical. Paraffins, halo-paraffins, and aliphatic $C_8$ to $C_{20}$ ketones can also be used, especially in combination with soaps, as foam inhibitors. These non-surface-active foam inhibitors are suitably sprayed on the finished washing agent, but any solid washing agent components can be used for this purpose and then mixed with the usual washing agent constituents.

As indicated above, the foam stabilizers of the invention have the formulas of I, II, III, IV, V and VI. The RCO residues present in the foam stabilizers of these formulas may be of any origin whatever. They are preferably derived from the fatty acids of coconut and palm kernel fats or from the $C_{10}$ to $C_{14}$ or $C_{12}$ to $C_{14}$ fractions of these fatty acids. Also RCO residues containing only 10, 12 or 14 carbon atoms may be present.

These statements are obviously to be applied to the residues $R_1$; they are obtained from the corresponding nitriles or the possibly substituted amides by reduction of the carbonyl group.

The amide-like compounds of formulas I and II are obtainable, for example, by the condensation of the corresponding amine with a fatty acid or its chloride or esters. The amide-like compounds III are obtained by reacting a primary or secondary fatty alkyl amine with the δ-lactone of gluconic acid. Compounds of formula IV are obtained from the corresponding tertiary amines and those of formula V from the corresponding primary amines by reaction with chloracetic acid or salts of chloracetic acid or with propiolactone. Compounds of formula VI are obtained from the corresponding tertiary amines by reaction with haloalkylsulfonic acid salts, for example with chlorethane-sulfonic acid or with propanesultone, 1,3- or 1,4-butane-sultone or with pentanesultones.

The betaine-like foam stabilizers IV and VI show a specially good effect when the anionic detergent consists wholly or partly, preferably 5 to 50 percent and advantageously 5 to 20 percent of its weight, of surface-active sulfates, especially fatty alcohol sulfates and/or fatty alcohol ethersulfates.

In the preparation of the washing agents according to the invention the said foam stabilizers may be incorporated at will in the combination of surface-active compounds, and when powdered washing agents are being produced, may be sprayed with these. The foam stabilizers may also be sprayed on the finished washing agent powder or on a part of this powder, which is then admixed with the remaining solid constituents of the washing agent.

By combining the foam stabilizers to be used according to the invention which are also active at low temperatures, with the said foam inhibitors whose action is dependent on the temperature, combinations of surface-active compounds or washing agents are obtained which, when used as fine washing agents at temperatures up to 60° C, foam well, while foam inhibitors become more and more active when this range of temperature is exceeded and the foam is so strongly depressed that the products can be used directly in drum washing machines.

The products according to the invention can be used for washing and washing with bleaching of a variety of different fibers of natural or synthetic origin. Besides the textiles of cotton, regenerated celluloses or linen, which are usually treated at temperatures of 70° to 100° C, the so-called "easy care" textiles, which consist of chemically treated cotton or synthetic man-made fibers, such as polyamide, polyester, polyacrylonitrile, polyurethane, polyvinyl chloride or polyvinylidene chloride fibers, or contain at least 30 percent of these, can be washed and/or bleached according to the invention. Fabrics made from mixed man-made-cotton fibers, which may be specially finished, also belong to the textiles denoted as "easy-care," occasionally also as "non-iron."

For the bleaching or washing of these "easy-care" textiles, temperatures of 20° to 70° C, preferably 30° to 60° C are suitable. For this purpose the washing agents according to the invention may contain a bleaching component already active at these temperatures, such as active chlorine compounds, organic percompounds, especially percarboxylic acids and inorganic percompounds, in combination with activators for these percompounds.

The anionic and/or non-ionic surface-active compounds which may be present in the products according to the invention contain in the molecule at least one hydrophobic radical having eight to 30, preferably 10 to 18, and advantageously 12 to 18 carbon atoms, and an anionic or non-ionic or amphoteric water-solubilizing group. The preferably saturated hydrophobic radical is usually of an aliphatic or alicyclic nature, and it may be combined with the water-solubilizing groups directly or through intermediate members. Suitable intermediate members are, for example, benzene rings, carboxylic acid ester or carboxylic acid amide groups, residues of polyhydric alcohols combined in ether- or ester-like way, as for example, those of ethylene glycol, propylene glycol, glycerine or corresponding polyether residues.

The hydrophobic radical is preferably an aliphatic hydrocarbon radical with 10 to 18 carbon atoms, but deviations from this preferred range of number of carbon atoms are possible, depending on the nature of the surface-active compound in question.

Soaps, which are derived from natural or synthetic fatty acids, possibly also from resin or naphthenic acids, are utilizable as anionic detergent substances. Fatty, resin or naphthenic acids of natural origin are frequently more or less unsaturated. They are preferably used in a partially or completely hydrogenated state, so that they have iodine values of not more than 30 and preferably of less than 10.

Among the synthetic anionic surface-active compounds, the sulfonates and sulfates have special practical importance.

The sulfonates include, for example, the alkylarylsulfonates, especially the alkylbenzene sulfonates, which may be obtained preferably from straight-chain aliphatic hydrocarbons having nine to 15, preferably 10 to 14, carbon atoms, by chlorination and alkylation of benzene or, from corresponding olefins with terminal or non-terminal double bonds, by alkylation of benzene and sulfonation of the alkylbenzenes obtained. Furthermore, aliphatic sulfonates are of interest such as are obtainable, for example, from preferably saturated hydrocarbons containing 8 to 18 and preferably 12 to 18 carbon atoms in the molecule by sulfochlorination with sulfur dioxide and chlorine or sulfoxidation with sulfur dioxide and oxygen, and conversion of the products thereby obtained into the sulfonates. Further, aliphatic sulfonates which are utilizable may be mixtures of alkene sulfonates, hydroxyalkene sulfonates and hydroxyalkane sulfonates, which are obtained, for example, from $C_8$ to $C_{18}$, and preferably $C_{12}$ to $C_{18}$ olefins having terminal or non-terminal double bonds, by sulfonation with sulfur trioxide and acid or alkaline hydrolysis of the sulfonation products. In the aliphatic sulfonates thus prepared, the sulfonate group is frequently attached to a secondary carbon atom. However, sulfonates with a terminal sulfonate group may also be prepared by reacting olefins having a terminal double bond with bisulfite.

The sulfonates to be used according to the invention also include salts, preferably dialkali metal salts of a-sulfo-fatty acids, as well as salts of esters of these acids with mono- or poly-hydric alcohols containing one to four and preferably one or two carbon atoms.

Further useful sulfonates are the fatty acid esters of hydroxethanesulfonic acid and dihydroxypropane-sulfonic acid, the fatty alcohol esters of lower aliphatic or aromatic, sulfo-mono- and sulfo-di-carboxylic acids containing 1 to 8 carbon atoms, the alkylglyceryl ether sulfonates and the condensation products of fatty acids or sulfonic acids with aminoethanesulfonic acid.

Surface-active compounds of the sulfate type which may be mentioned include the fatty alcohol sulfates, especially those derived from coconut fatty alcohols, tallow fatty alcohols or oleyl alcohol. Useful sulfonation products of the sulfate type can also be prepared from $C_8$ to $C_{18}$ olefins with terminal or non-terminal bonds. Sulfated fatty acid alkylolamides, sulfated monoglycerides and sulfated products of ethoxylated and/or propoxylated compounds such as fatty alcohols, alkylphenols with eight to 15 carbon atoms in the alkyl radical fatty acid amides, fatty acid alkylolamides and so on, where 0.5 to 20, preferably one to eight, and especially 2 to 4 mols of ethylene and/or propylene oxide are added to one mol of the said compounds to be ethoxylated and/or propoxylated, also belong to this group of surface-active compounds.

The washing agents according to the invention may also contain synthetic surface-active carboxylates, for example the fatty acid esters or fatty alcohol ethers of hydroxycarboxylic acids as well as the condensation products of fatty acids or sulfonic acids with aminocarboxylic acids, for example with glycocoll, sarcosine or with albumin hydrolysates.

The non-ionic surface-active compounds, for the sake of simplicity called here "Non-ionics," include products which owe their solubility in water to the presence of polyether chains, amineoxide, sulfoxide or phosphineoxide groups, alkylolamide groups and, quite generally, a large number of hydroxyl groups.

The products obtainable by addition of ethylene oxide and/or glycide to fatty alcohols, alkylphenols, fatty acids, fatty amines, fatty acid amides and sulfonic acid amides are of particular practical interest. These "Non-ionics" may contain four to 100, preferably six to 40, and advantageously eight to 20 ether residues, especially ethylene glycol ether residues, per molecule. Moreover, propylene or butylene glycol ether residues may be present either in these polyglycol ether residues or at their ends.

In addition, the "Non-ionics" also include the water-insoluble polypropylene glycols made water-soluble by addition of ethylene oxide, and known by the trade names of "Pluronics," "Tetronics"b or "Ucon Fluid." Also addition products of propylene oxide to alkylenediamines or lower aliphatic alcohols containing one to eight and preferably three to six carbon atoms are included as "Non-ionics."

Further useful "Non-ionics" are fatty acid or sulfonic acid alkylolamides, which are derived, for example, from the mono- or di-alkylolamines, dihydroxypropylamine or other polyhydroxyalkylamines, such as the glycamines. They can be replaced by amides of higher primary or secondary alkylamines and polyhydroxycarboxylic acids.

"Non-ionics" from the group of amineoxides, derived from higher tertiary amines having one hydrophobic alkyl radical and two shorter alkyl and/or alkylol radicals containing up to 4 carbon atoms each, are of special interest.

The builders present in the products according to the invention include weakly acid, neutral and alkaline reacting inorganic or organic salts, especially inorganic or organic complex-forming compounds.

Weakly acid, neutral or alkaline reacting salts utilizable according to the invention are, for example, the bicarbonates, carbonates or silicates of the alkali metals, mono-, di- or tri-alkali metal orthophosphates, di- or tetra-alkali metal-pyrophosphates, alkali-metal metaphosphates known as complex-forming compounds, alkali metal sulfates and the alkali metal salts of organic, non-surface-active sulfonic acids, carboxylic acids and sulfocarboxylic acids containing one to eight carbon atoms. These include, for example, water-soluble salts of benzene, toluene or xylene sulfonic acids, water-soluble salts of sulfoacetic acid, sulfobenzoic acid or the salts of sulfodicarboxylic acids, as also the salts of acetic acid, lactic acid, citric acid and tartaric acid.

Further, the water-soluble salts of high molecular weight polycarboxylic acids are useful as builders, especially polymerizates of maleic acid, itaconic acid, mesaconic acid, fumaric acid, aconitic acid, methylene-malonic acid and citraconic acid. Copolymers of these acids with one another or with other polymerizable substances, such as, for example, with ethylene, propylene, acrylic acid, methacrylic acid, crotonic acid, 3-butene-carboxylic acid, 3-methyl-3-butenecarboxylic acid, and with vinylmethyl ether, vinyl acetate, isobutylene, acrylamide and styrene, are also useful.

Suitable complex-forming builders are the weakly acid reacting metaphosphates and the alkaline reacting polyphosphates, especially the tripolyphosphate. They may be wholly or partly replaced by organic complex-forming compounds.

The organic complex-forming compounds include, for example, nitrilotriacetic acid, ethylenediaminetetraacetic acid, N-hydroxyethyl-ethylenediaminetriacetic acid, polyalkylenepolyamine-N-polycarboxylic acids and other known organic complex-forming compounds. Combinations of different complex-forming compounds may also be used. Di- and polyphosphonic acids of the following constitutions also belong to the other known complex-forming compounds.

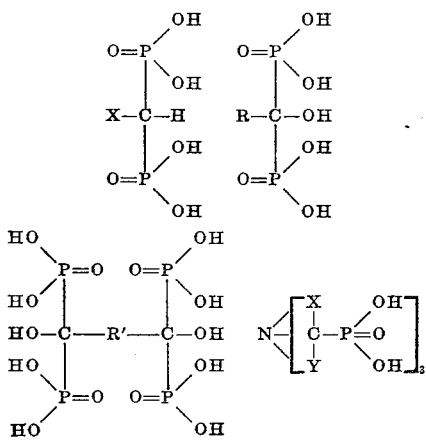

wherein R represents alkyl and R' represents alkylene radicals with one to eight, preferably with one to four carbon atoms, and X and Y represent hydrogen atoms or alkyl radicals with one to four carbon atoms. Carboxy-methylenephosphonic acid ($HOOC-CH_2-PO(OH)_2$) is also useful as a complex-forming compound according to the invention. All these complex-forming compounds may be present as free acids, but are preferred as the alkali metal salts.

Alkaline reacting builders are present in the washing agents according to the invention in such amounts that a 1 percent solution of the washing agent has a pH value in the region of eight to 12, preferably from nine to 11.

Of the inorganic percompounds, the compounds having a neutral or alkaline reaction in aqueous solution, especially the perborates, have the greatest practical interest.

Among the various perborates, sodium perborate tetrahydrate ($NaBO_2 \cdot H_2O_2 \cdot 3H_2O$) is of most practical importance. Partially or completely dehydrated perborates, that is up to the approximate composition $NaBO_2 \cdot H_2O_2$, may also be used in its place. Finally, active oxygen-containing borates, $NaBO_2 \cdot H_2O_2$ are also useful in which the ratio of $Na_2O : B_2O_3$ is less than 0.5 : 1 and preferably lies in the region from 0.4 to 0.15 : 1, and in which the ratio of $H_2O_2$ : Na lies in the region of 0.5 to 4:1. These products are described in the German Pat. No. 901,287 and in the U. S. Pat. No. 2,491,789.

The perborate may be wholly or partly replaced by other inorganic percompounds, especially by peroxyhydrates, as for example the peroxyhydrates of ortho-, pyro- or polyphosphates and also the carbonates.

The foam-regulated washing agents according to the invention may contain the usual water-insoluble or water-soluble stabilizers for percompounds in amounts up to 10 percent, preferably 0.5 to 8 percent, by weight.

Suitable water-insoluble percompound stabilizers are the various magnesium silicates. These are mostly precipitation products, which are formed when aqueous solutions of alkali metal silicates are combined with solutions of magnesium salts. The ratio $MgO : SiO_2$ may lie in the region of 4:1 to 1:4, preferably from 2:1 to 1:2. A product with an $MgO : SiO_2$ ratio of 1:1 is often used. These magnesium silicates may be replaced by the corresponding silicates of other alkaline earth metals, or of cadmium or tin. Water-containing tin oxides are also utilizable as stabilizers. These percompound stabilizers are usually present in amounts from 1 to 8 percent preferably from 2 to 7 percent of the weight of the whole preparation.

The water-insoluble percompound stabilizers may be wholly or partly replaced by water-soluble percompound stabilizers. The organic complex-forming compounds already enumerated above are suitable and the amount used thereof may lie in the range from 0.1 to 5 percent, preferably from 0.25 to 2.5 percent by weight of the total amount of washing agent, depending on the stability of the complex formed. These complex-forming compounds furthermore also stabilize the optical brighteners, so that they may also be incorporated in washing agents containing brighteners when these washing agents do not contain percompounds.

The active chlorine compounds useful as bleaching agents may be inorganic or organic. The inorganic active chlorine compounds include alkali metal hypochlorites, which may be used especially in the form of their mixed salts or addition compounds with orthophosphates or condensed phosphates, as for example, with pyro- and poly- phosphates, or with alkali metal silicates. If the washing agents and washing agent adjuvants contain monopersulfates and chlorides, active chlorine is formed in aqueous solution.

Suitable organic active chlorine compounds are, in particular, the N-chloro-compounds in which one or two chlorine atoms are linked to a nitrogen atom, the third valency of the nitrogen atom being preferably linked to a negative group, especially a CO— or $SO_2$ group. These compounds include dichloro- and trichloro-cyanuric acid, chlorinated alkylguanides or alkylbiguanides, chlorinated hydantoin and chlorinated melamine.

Further, dirt carriers or soil suspension agents are contained in the preparations according to the invention, which hold the dirt, detached from the fiber, suspended in the washing bath and thus prevent graying. For this purpose water-soluble colloids usually organic in nature are suitable, as for example, the water-soluble salts of polymeric carboxylic acids, glue, gelatine, salts of ethercarboxylic acids or ethersulfonic acids of starch or cellulose or salts of acid sulfuric acid esters of cellulose or starch. Water-soluble polyamides containing acid groups are also suitable for this purpose. Furthermore, starch and other than the above-mentioned starch products can be used, as for example, degraded starch, aldehyde starches and so on. Polyvinylpyrrolidone is also utilizable.

The washing action of the combinations of surface-active compounds according to the invention which do not contain branched-chain carboxylic acids of the above-indicated constitution or their salts as textile softeners, can be improved by an addition of enzymes. This obviously also applies to washing agents containing these combinations of surface-active compounds.

Suitable enzymes are chiefly proteases, amylases and lipases, which may be incorporated in the products according to the invention either alone or in conjunction with one another. Where finished washing agents or washing agent adjuvants are concerned, their protease content may correspond to activities of 50 to 5,000, preferably 100 to 2,500 LVE; their amylase content, to activities of 20 to 5,000, preferably 50 to 2,000 SKBE; and their lipase content, to activities of 2 to 1,000, preferably 5 to 500 IE per gram of said washing agent or washing agent adjuvant.

When the preparations according to the invention relate to combinations of surface-active compounds which are frequently used in combination with the usual builders and additives in industrial laundries, the enzyme content of these preparations can be so high that the product composed of the respective combination of surface-active compounds used and the other constituents of washing agents and washing agent adjuvants simultaneously used has the above given enzyme content. Since the combination of surface-active compounds may constitute 5 to 80 percent, preferably 15 to 40 percent, of a finished washing agent or washing agent adjuvant, enzyme activities are calculated for the combinations of surface-active compounds which correspond to 62.5 to 100,000 LVE in the case of proteases, 25 to 100,000 SKBE in the case of amylases and 2.5 to 20,000 IE in the case of lipases, per gram of the combinations of surface-active compounds. Of course, combinations of surface-active compounds with such high enzyme activities as are present in the upper limits, can only be prepared when very active enzyme preparations are available. Therefore, one is usually restricted to maximum values for activity of 50,000 LVE, 50,000 SKBE and 10,000 IE per gram of combinations of surface-active compounds. The enzyme activities are preferably in the range of 250 to 15,000 LVE, 125 to 15,000 SKBE, and 12.5 to 3,500 IE per gram of combinations of surface-active compounds.

The above data on the content of enzymes and activities of the preparations according to the invention are obtained from the activities of those enzyme preparations which are available at the present time, from the standpoint of economy, for use in the washing agent field. From the technical-chemical standpoint the enzyme activities of the preparations according to the invention can be increased, if feasible, so that the activities as regards proteases and amylases can be raised to 5 times, and as regards lipases, to 10 times the above given maximum values. Therefore, should, in the future, enzyme preparations with higher enzyme contents be supplied, which also appear suitable economically for use in washing agents, one has the choice either of keeping the enzyme activity of the preparation to the above given height by use of smaller amounts of enzymes or of increasing the enzyme activity with use of the same amount of enzymes.

The following references in the literature are referred to relative to the determination of the enzyme activities:

Determination of the activity of proteases by Lohlein-Volhard:

A. Kunzel: "Gerbereichemisches Taschenbuch," 6th Ed., Dresden and Leipzig, 1955.

Determination of the activity of amylases:

J. Wohlgemuth: "Biochemische Zietschrift" 1908, Vol. 9, pages 1 – 9; and

R. M. Sandsteadt, E. Kneen and M. J. Blish: "Cereal Chemistry," 1939, Vol. 16, pages 712–723.

Determination of the activity of lipases:

R. Willstatter, E. Waldschmidt-Leitz and Fr. Memmen: "Hoppe-Seyler's Zeitschrift fur physiologische Chemie", 1923, Vol. 125, pages 110–117; and R. Boissonas: "Helvetia Chimica Acta,"1948, Vol. 31, pages 1571 – 1576.

The enzymes which may be utilized may be obtained from animals, microorganisms such as bacteria or fungi, and plants, especially from digestive ferments, yeasts and strains of bacteria. They usually represent a complicated mixture composed of various enzymatic active substances. According to their action they are denoted as proteases, carbohydrases, esterases, lipases, oxidoreductases, catalases, peroxidases, ureases, isomerases, lyases, transferases, desmolases or nucleases. The enzymatic substances obtained from strains of bacteria or fungi, such as Bacillus subtilis and Streptomyces griseus, are of special interest. Further useful enzymes are pepsin, pancreatin, trypsin, papain and diastase. The enzyme preparations obtained from Bacillus subtilis, however, have the advantage, as compared with the last-named enzymes, in that they are relatively stable with respect to alkali, percompounds and anionic detergents, and even at temperatures between 45° and 70° C are still not appreciable inactivated. Their relatively great stability towards oxidizing agents possibly depends on their small content of free sulfhydryl groups.

The enzymes are marketed by the producers usually with addition of blending agents. Suitable blending agents are sodium sulfate, sodium chloride, alkali metal ortho-, pyro- or polyphosphates, especially tripolyphosphates. The still moist enzyme preparations are frequently incorporated with calcined salts, which then, in some cases with agglomeration of the particles present to larger particles, bind the water present together with the enzymatic substance as water of crystallization.

If the enzymatic substances are present as dry products, liquid or paste-like non-ionic organic compounds, as for example, ethylene glycol, polyethylene glycols, butylene glycols or polybutylene glycols, and also the known liquid to paste-like surface-active compounds, which are obtained for example, by adding ethylene oxide and possibly propylene oxide to the starting materials known for the preparation of such products, can also be used for binding the enzymatic active substance to the respective preparation to be made. For this purpose, a mixture of the components of the combination of surface active compounds or of the washing agent and the enzymatic substance, for example, is sprayed with these non-ionic products, or the enzymatic substance is dispersed in the said non-ionic substances and this dispersion is united with the other constituents of the product. If the other constituents of the products are solids, the dispersion of the enzymatic substances in the non-ionic component can be sprayed on the other solid constituents.

The following examples are illustrative of the practive of the invention. However, they are not to be deemed limitative in any manner.

EXAMPLES

The following examples describe the compositions of some of the combinations of surface-active compounds according to the invention or a few washing agents with a content of such surface-active combinations. In the formulations:

"ABS" is the alkali metal salt of an alkylbenzenesulfonic acid with 10 to 15, preferably 11 to 13, carbon atoms in the alkyl chain, obtained by condensing straight chain olefins with benzene and sulfonating the alkylbenzene so obtained.

"Alkane sulfonate" is an alkali metal sulfonate obtained from paraffins with 12 to 16 carbon atoms by the sulfoxidation method.

"Fatty acid ester sulfonate" is an alkali metal sulfonate obtained from the methyl ester of a hardened tallow fatty acid by sulfonating with $SO_3$.

"Olefin sulfonate" is an alkali metal sulfonate obtained from straight chain olefins (12 to 16 carbon atoms) with terminal or non-terminal bonds by sulfonation with $SO_3$ and hydrolysis of the sulfonation product with an alkali liquor. The said sulfonate consists substantially of alkene sulfonate and hydroxyalkane sulfonate, but contains small quantities of alkane disulfonates.

"Oleyl alcohol + 5 EO" or "Oleyl alcohol + 10 EO" are the products of addition of 5 or 10 mols of ethylene oxide to one mol of a commercial oleyl alcohol.

"Oleyl alcohol ether sulfate" or "Tallow alcohol ether sulfate" or "Coconut alcohol ether sulfate" are, respectively, the sulfated products of addition of 2 mols of ethylene oxide to 1 mol of oleyl alcohol, or of 3 mols of ethylene oxide to 1 mol of tallow fatty alcohol, or of 2.5 mols of ethylene oxide to 1 mol of coconut fatty alcohol.

"Tallow alcohol sulfate" or "Coconut alcohol sulfate" are the alkali metal salts of the sulfated fatty alcohols prepared by reduction of tallow fatty acid or coconut fatty acid.

"Betaine" or "Sulfobetaine" are the products obtained by reacting a coconut-alkyl-dimethylamine, prepared from coconut fatty acid, with chloracetic acid or with propanesultone, respectively.

"Dicoconut-alkyl-aminopropionate" is the carboxylic acid salt of an alkali metal obtained from the corresponding dialkylamine (prepared from coconut fatty acid) by reacting with methyl acrylate and saponifying the reaction product.

"Dioctylacetate" is the alkali metal salt of dioctylacetic acid ($\alpha$-n-octyl-capric acid).

The composition of the fatty acid mixtures, from which the various soaps contained in the combinations of surface-active compounds or washing agents were produced, may be taken from the following Table I.

TABLE I

Composition of the Fatty Acid Mixtures

Corresponding to the Soaps

| No. of carbon atoms in the fatty acid | Weight Percent of Fatty Acid Component in the Soap | | | |
|---|---|---|---|---|
| | Soap 818 | Soap 1018 | Soap 1022 | Soap 1222 |
| $C_8$ | 2 | | | |
| $C_{10}$ | 2 | 1 | 1 | |
| $C_{12}$ | 16 | 6 | 19 | 16 |
| $C_{14}$ | 10 | 5 | 8 | 8 |
| $C_{16}$ | 25 | 28 | 17 | 6 |
| $C_{18}$ | 45 | 60 | 33 | 16 |
| $C_{20}$ | | | 4 | 7 |
| $C_{22}$ | | | 18 | 47 |
| Iodine value of the fatty acid mixture | 10 | 7.5 | 5 | 8 |

Unless specified to the contrary, the anionic surface-active compounds and the other salts are present as the sodium salts. All percentages given are by weight.

In the examples the foam inhibitor is associated with the combination of surface-active compounds, even when it is not surface-active itself. This is justified insofar as the influence of the foam inhibitors on the foaming of the surface-active compounds does not depend on whether the foam inhibitors are surface-active compounds or non-surface-active compounds.

In the preparation of the products, the foam inhibitor used in each case, dissolved in a suitable organic solvent or in the molten state, was sprayed by means of a jet nozzle on the agitated pulverulent combination of surface-active compounds or on the agitated pulverulent washing agent.

In the combinations of surface active-compounds described, a mixture of about 45 percent of a bis-(alkylamino)-monochlorotriazine and about 55 percent of an N,N',N''trialkylmelamine was used as foam inhibitor. In all these triazine derivatives, the alkyl residues were present as a mixture of homologs containing eight to 18 carbon atoms.

If the combinations of surface-active compounds described in the examples contain synthetic sulfates and/or sulfonates together with soap, paraffins or paraffin oil, for example, are suitable as foam inhibitors.

The following Examples 1 to 9 describe different combinations of surface-active compounds with a content of foam stabilizers and foam inhibitors which are dependent on temperature. In the range of temperature from 20° to 50°C., aqueous solutions of these combinations of surface-active compounds showed a powerful development of foam. After a temperature of 50°C. was exceeded, the antifoaming action of the foam inhibitors began to take effect and, after 65°C. was passed, this action increased more and more.

Two formulations are given for each example; the formulation b differs from the formulation a in each case by its content of a branched chain carboxylic acid textile softener.

EXAMPLE 1

| a | b | |
|---|---|---|
| 49.0% | 32.8% | ABS |
| 4.0% | 2.7% | Tallow alcohol sulfate |
| 12.0% | 8.0% | Coconut alcohol sulfate |
| 25.0% | 16.8% | Oleyl alcohol + 10 EO |
| 6.0% | 4.0% | Sulfobetaine |
| 4.0% | 2.7% | Foam inhibitor |
| 0 | 33.0% | Dioctylacetate |

EXAMPLE 2

| a | b | |
|---|---|---|
| 49.0% | 32.3% | ABS |
| 13.0% | 8.6% | Coconut alcohol sulfate |
| 16.0% | 10.6% | Oleyl alcohol + 10 EO |
| 13.0% | 8.6% | Soap 818 |
| 5.0% | 3.3% | Sulfobetaine |
| 4.0% | 2.6% | Foam inhibitor |
| 0 | 34.0% | Dioctylacetate. |

EXAMPLE 3

| a | b | |
|---|---|---|
| 39.0% | 24.9% | ABS |
| 12.0% | 7.7% | coconut alcohol ether sulfate |
| 2.0% | 1.3% | Tallow alcohol sulfate |
| 10.0% | 6.4% | Coconut alcohol sulfate |
| 33.0% | 21.2% | Soap 1222 |
| 4.0% | 2.6% | Betaine |
| 0 | 36.0% | Dicoconut-alkyl-aminopropionate |

EXAMPLE 4

| a | b | |
|---|---|---|
| 26.0% | 17.0% | Fatty acid ester sulfonate |
| 15.0% | 10.0% | Coconut alcohol sulfate |
| 13.0% | 8.7% | Oleyl alcohol + 5 EO |
| 42.0% | 27.7% | Soap 1022 |
| 4.0% | 2.6% | Sulfobetaine |
| 0 | 34.0% | Dicoconut-alkyl-aminopropionate |

EXAMPLE 5

| a | b | |
|---|---|---|
| 60.0% | 39.0% | Alkane sulfonate |
| 13.0% | 8.5% | Coconut alcohol sulfate |
| 21.0% | 13.7% | Oleyl alcohol + 10 EO |
| 3.0% | 1.9% | Betaine |
| 3.0% | 1.9% | Foam inhibitor |
| 0 | 35.0% | Dioctylacetate |

EXAMPLE 6

| a | b | |
|---|---|---|
| 27.0% | 19.2% | Olefin sulfonate |
| 13.0% | 9.2% | Tallow alcohol sulfate |
| 19.0% | 13.5% | Oleyl alcohol + 10 EO |
| 38.0% | 27.0% | Soap 1022 |
| 3.0% | 2.1% | Sulfobetaine |
| 0 | 29.0% | Dioctylacetate |

EXAMPLE 7

| a | b | |
|---|---|---|
| 25.0% | 19.6% | Oleyl alcohol ether sulfate |
| 12.0% | 9.5% | Coconut alcohol sulfate |

| | | |
|---|---|---|
| 29.0% | 23.3% | Oleyl alcohol + 5 EO |
| 29.0% | 22.3% | Soap 1222 |
| 5.0% | 4.0% | Sulfobetaine |
| 0 | 22.3% | Dioctylacetate |

EXAMPLE 8

| a | b | |
|---|---|---|
| 35.0% | 23.4% | Tallow alcohol ether sulfate |
| 7.0% | 4.7% | Tallow alcohol sulfate |
| 7.0% | 4.7% | Coconut alcohol sulfate |
| 21.0% | 14.1% | Oleyl alcohol + 5 EO |
| 21.0% | 14.1% | Soap 1018 |
| 5.0% | 3.3% | Betaine |
| 4.0% | 2.7% | Foam inhibitor |
| 0 | 33.0% | Dicoconut-alkyl-aminopropionate |

EXAMPLE 9

| a | b | |
|---|---|---|
| 57.0% | 39.9% | ABS |
| 24.0% | 16.8% | coconut alcohol ether sulfate |
| 12.0% | 8.4% | Coconut alcohol sulfate |
| 4.0% | 2.8% | Betaine |
| 3.0% | 2.1% | Foam inhibitor |
| 0 | 30.0% | Dicoconut-alkyl-aminopropionate |

The following examples describe a few washing agents which contain combinations of surface-active compounds according to Examples 1 to 9. In the formulations:

"CMC is the sodium salt of carboxymethylcellulose.

"EDTA" is the sodium salt of ethylenediaminetetraaceticacid.

"NTA" is the sodium salt of nitrilotriacetic acid.

"Waterglass" is a sodium silicate of the composition: $Na_2O \cdot 3.3\ SiO_2$.

"Perborate" is a product containing about 10 percent of active oxygen of the approximate composition: $NaBO_2 \cdot H_2O_2 \cdot 3H_2O$.

"Cotton brightener" is the commercial product: "Blankophor BBH/S II".

"Polyamide brightener" is the commercial product: "Purwil P".

"Polyester brightener I" is the commercial product: "Uvitex SOF".

"Polyester brightener II" is the product: "Calcofluor white ALF".

EXAMPLE 10

An all purpose washing agent, the aqueous solution of which foams well at temperatures up to 45°C., but produces less and less foam as the temperature rises over 60°C., so that it can be used in drum washing machines even at boiling temperature, has the following composition:

18.2% of the combination of surface-active compounds according to Example 1(a) or 1(b)
2.0% CMC
0.2% EDTA
30.0% $Na_5P_3O_{10}$
6.0% Waterglass
2.5% $MgSiO_3$
0.25% Cotton brightener
0.03% Polyamide brightener
32.0% Perborate
Remainder Blue
 dyestuff, perfume
 and
water

EXAMPLE 11

All purpose washing agent similar to Example 10.

23.2% of the combination of surface-active compounds according to Examples 2(a) or 2(b)
1.8% CMC
0.3% EDTA
35.0% $Na_5P_3O_{10}$
4.5% Waterglass
0.3% Cotton brightener
0.02% Polyamide brightener
0.5% Polyester brightener I
27.0% Perborate
Remainder Green
 dyestuff, perfume
 and
water

EXAMPLE 12

All purpose washing agent similar to Example 10.

19.9% of the combination of surface-active compounds pounds according to Example 3(a) or 3(b)
1.3% CMC
0.22% EDTA
15.0% NTA
28.0% $Na_5P_3O_{10}$
5.0% Waterglass
2.0% $MgSiO_3$
0.5% Cotton brightener
0.05% Polyamide brightener
0.2% Polyester brightener II
24.0 Perborate
Remainder Perfume
and water

EXAMPLE 13

All purpose washing agent similar to Example 10.

23.2% of the combination of surface-active compounds according to Example 4(a) or 4(b)
1.9% CMC
0.25% EDTA
5.0% NTA
24.0% $Na_5P_3O_{10}$
8.0% $Na_2CO_3$
4.0% Waterglass
0.4% Cotton brightener
0.04% Polyamide brightener
25.0% Perborate
Remainder Perfume
and water

EXAMPLE 14

All purpose washing agent similar to Example 10.

19.5% of the combination of surface-active compounds according to Examples 5(a) or 5(b)
1.2% CMC
0.5% EDTA
38.0% $Na_5P_3O_{10}$
3.8% Waterglass
0.18% Cotton brightener
0.5% Polyamide brightener
0.15% Polyester brightener I
0.1% Polyester brightener II
23.5% Perborate
Remainder Blue-green
 dyestuff, perfume
and water.

EXAMPLE 15

All purpose washing agent similar to Example 10.

26.2% of the combination of surface-active compounds according to Examples 6(a) or 6(b)
1.4% CMC
0.4% EDTA
8.0% NTA
21.0% $Na_5P_3O_{10}$
4.2% Waterglass
3.0% $MgSiO_3$
0.35% Cotton brightener
0.03% Polyamide brightener
0.7% Polyester brightener II
22.0% Perborate
Remainder Perfume
and water

EXAMPLE 16

For use for washing colored and easy-care fabrics at temperatures up to 60°C., certain washing agents are preferred which, however, should also possess a sufficient inhibition of foaming at temperatures up to 100°C. The following is a recipe for such a washing agent:

```
21.6% of the combination of surface-
  active compounds according to
  Example 7(a) or 7(b)
 1.5% CMC
33.0% Na₅P₃O₁₀
 3.5% Waterglass
 5.0% Na₂SO₄
22.0% Perborate
Remainder Perfume
  and water.
```

EXAMPLE 17

For washing easy-care textiles at temperatures up to 60°C., certain washing agents are preferred which, however, should be safe from foaming at temperatures up to 100°C. The following is a recipe for such a washing agent:

```
21.1% of the combination of surface-
  active compounds according to
  Example 8(a) or 8(b)
 1.3% CMC
10.0% NTA
35.0% Na₅P₃O₁₀
 3.7% Waterglass
18.0% Na₂SO₄
Remainder Perfume
  and water
```

EXAMPLE 18

This washing agent has the same field of application as the product according to Example 17.

```
30.0% of the combination of surface-
  active compounds according to
  Example 9(a) or 9(b)
 1.7% CMC
48.0% Na₅P₃O₁₀
 4.5% Waterglass
10.0% Na₂SO₄
Remainder Perfume
  and water
```

EXAMPLE 19

A prewashing agent, which, however, in case of need, can also be used at boiling temperatures without giving rise to frothing over.

```
11.3% of the combination of surface-
  active compounds according to
  any of the Examples 1(a) to
  9(a) or 1(b) to 9(b)
 1.6% CMC
 0.5% EDTA
46.0% Na₅P₃O₁₀
 4.0% Waterglass
 0.3% Cotton brightener
 0.05% Polyamide brightener
22.0% Sodium sulfate
Remainder Perfume
  and water
```

The combinations of surface-active compounds described in Examples 1 to 9 and the combinations of builders present in Examples 10 to 18 as well as other washing agent constituents could also be combined with one another in other proportions.

The washing agents containing combinations of surface-active compounds according to Examples 1a to 9a and described in Examples 10 to 19 were also prepared with the addition of enzymes. As enzymes, commercial products were used which had been adjusted by the manufacturer by addition of sodium sulfate in quantities of 7 to 15% to have the following activities:

A protease with 125,000 LVE/gm
An amylase with 75,000 SKBE/gm
A lipase with 10,000 IE/gm.

In addition to the amount of enzyme, the enzyme activity is also given in the examples, based on 1 gm of washing agent.

EXAMPLE 20

A washing agent according to one of the Examples 10 to 19, the combination of surface-active compounds which is constituted according to the details in Examples 1a to 9a, contains 0.3 to 1.5 percent by weight of protease (375 to 1,875 LVE/gm).

EXAMPLE 21

A washing agent according to one of the Examples 10 to 19, the combination of surface-active compounds which is constituted according to the details in Examples 1a to 9a, contains 1.2 percent by weight of lipase (120 IE/gm).

EXAMPLE 22

A washing agent according to one of the Examples 10 to 19, the combination of surface-active compounds which is constituted according to the details in Examples 1a to 9a, contains 0.4 percent by weight of protease (500 LVE/gm) and 1.0 percent by weight of amylase (750 SKBE/gm).

EXAMPLE 23

A washing agent according to one of the Examples 10 to 19, the combination of surface-active compounds which is constituted according to the details in Examples 1a to 9a, contains 2.0 percent by weight of amylase (1,500 SKBE/gm).

EXAMPLE 24

A washing agent according to one of the Examples 10 to 19, the combination of surface-active compounds which is constituted according to the details in Examples 1a to 9a, contains 0.2 percent by weight of protease (250 LVE/gm), 0.5 percent by weight of amylase (375 SKBE/gm), and 0.5 percent by weight of lipase (50 IE/gm).

EXAMPLE 25

A washing agent according to one of the Examples 10 to 19, the combination of surface-active compounds which is constituted according to the details in Examples 1a to 9a, contains 1.0 percent by weight of protease (1,250 LVE/gm), 0.3 percent by weight of amylase (225 SKBE/gm), and 0.4 percent by weight of lipase (40 IE/gm).

The combinations of surface-active compounds, in which no branched chain carboxylic acids of the above-indicated formula

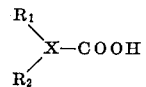

or their salts, acting as textile softeners, are present, may also contain enzymes according to the invention. The formulations and the enzyme contents of such combinations of surface-active compounds can be derived at once from the formulations of the enzyme-containing washing agents by omission of the builders, especially those present in relatively large quantities. Since, of course, enzymes frequently come on the market admixed with sodium sulfate, tripolyphosphate and other customary washing agent components, or granulated with these, these combinations of surface-active compounds contain certain amounts of such salts. Moreover, washing agent constituents which are usually present only in small quantities as, for example, dirt carriers (CMC), complex-forming compounds (EDTA) and brighteners, may be incorporated without objection in such combinations of surface-active compounds.

It is technically directly possible, and from the standpoint of the washing action obtained also regarded as sensible, to incorporate enzymes either in the combinations of surface-active compounds or in the washing agents, which also contain the above-described branched chain carboxylic acids acting as textile softeners as is described in our copending application Ser. No. 745,952, filed concurrently herewith.

The preceding specific embodiments are illustrative of the practice of the invention. It is to be understood, however, that other expedients known to those skilled in the art may be employed without departing from the spirit of the invention or the scope of the appended claims.

We claim:

1. A combination of detergent components for use in a washing bath having controlled foaming properties consisting essentially of (a) from 99 to 84 percent by weight of surface-active compounds, said surface-active compounds consisting of (1) from 25 to 80 percent by weight of said surface-active compounds selected, of anionic surface-active compounds selected from the group consisting of sulfonates and sulfates, (2) from 5 to 35 percent by weight of said surface-active compounds, of non-ionic surface-active compounds, (3) from 0 to 40 percent by weight of said surface-active compounds, of straight-chain fatty acid soaps having iodine values of not more than 30, including from 0 to 30 percent by weight of said surface-active compounds, of straight-chain saturated fatty acid soap having from 20 to 30 carbon atoms, acting as a foam inhibitor, active at temperatures above 60°C, and (4) from 20 to 50 percent by weight of said surface-active compounds of a branched chain carboxylic acid textile softener having the formula

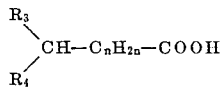

and its water-soluble salts, wherein each of $R_3$ and $R_4$ are alkyl having six to 18 carbon atoms and n represents the whole numbers 0 to 2, (b) from 1 to 10 percent by weight of a foam stabilizer compound active at temperatures up to 60°C having the formula

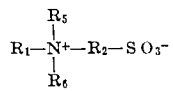

wherein $R_1$ represents an aliphatic hydrocarbon with 10 to 18 carbon atoms selected from the group consisting of alkyl and alkenyl, $R_2$ represents an alkylene group with two to five carbon atoms, and $R_5$ and $R_6$ represents members selected from the group consisting of methyl, ethyl, hydroxyethyl, hydroxypropyl and dihydroxypropyl, and (c) from 0 to 10 percent by weight of non-surface-active foam inhibitors active at temperatures above 60°C selected from the group consisting of chlorine-containing N-alkylated aminotriazines, N-alkylated aminotriazines and mixtures thereof where the alkyls have from eight to 18 carbon atoms, wherein at least one of the two foam-inhibiting components (a) (3) and (c) is always present.

2. The combination of detergent components of claim 1 wherein $R_1$ is an alkyl derived from a mixture of fatty acids and at least 50 percent of said alkyl groups have from 10 to 14 carbon atoms.

3. The combination of detergent components of claim 2 wherein said alkyl groups having from 10 to 14 carbon atoms is more than 65 percent of the total mixture of alkyl groups.

4. The combination of detergent components of claim 1 wherein said saturated soap having from 20 to 30 carbon atoms is present in an amount of from 10 to 30 percent by weight of said surface-active compounds.

5. The combination of detergent components of claim 1, wherein said non-surface-active foam inhibitors are present in an amount of from 1 to 8 percent by weight.

6. The combination of detergent components of claim 5 wherein said non-surface-active foam inhibitors are present as discrete particles admixed with the other components of said combination.

7. The combination of detergent components of claim 1, having a further content of enzymes selected from the group consisting of proteases, amylases and lipases, wherein said proteases are present in an amount of 62.5 to 50,000 LVE per gram of said combination, said amylases are present in an amount of 25 to 50,000 SKBE per gram of said combination and said lipases are present in an amount of from 2.5 to 10,000 IE per gram of said combination.

8. The combination of detergent components of claim 7 wherein said proteases are present in an amount of 250 to 15,000 LVE per gram of said combination, said amylases are present in an amount of 125 to 15,000 SKBE per gram of said combination and said lipases are present in an amount of from 12.2 to 3,500 IE per gram of said combination.

9. Washing agents having controlled foaming properties consisting essentially of (a) from 10 to 80 percent of the combination of detergent components of claim 1, (b) from 14 to 87 percent of washing agent builders, at least part of said builders being alkaline reacting, and (c) from 3 to 30 percent by weight of bleaching components.

10. The washing agents of claim 9 wherein said builders are present in an amount of from 0.5 to 7 times the amount of said combination of detergent components.

11. The washing agents of claim 10 wherein said builders are present in an amount of from 1 to 5 times the amount of said combination of detergent components.

12. Washing agents having controlled foaming properties consisting essentially of (a) from 12 to 40 percent of the combination of detergent components of claim 1, (b) from 30 to 85 percent of washing agent builders, at least part of said builders being alkaline reacting and (c) from 3 to 30 percent by weight of bleaching components 13. The washing agents of claim 9 having a further content of enzymes selected from the group consisting of proteases, amylases and lipases, wherein said porteases are present in an amount of 50 to 5,000 LVE per gram of said washing agents, said amylases are present in an amount of 20 to 5,000 SKBE per gram of said washing agents and said lipases are present in an amount of from 2 to 100 IE per gram of said washing agents.

14. The combination of surface-active components of claim 1 wherein, in the formula, $R_1$ is coconut-alkyl prepared from coconut fatty acid, $R_5$ and $R_6$ are methyl and $R_2$ is n-propylene.

* * * * *